(12) United States Patent
Christudas et al.

(10) Patent No.: US 10,838,774 B2
(45) Date of Patent: Nov. 17, 2020

(54) METHOD AND A SYSTEM FOR FACILITATING MULTITENANCY OF SERVICES

(71) Applicant: IBS Software Services FZ-LLC, Dubai (AE)

(72) Inventors: Binildas Azhakamma Christudas, Trivandrum (IN); John Varghese, Trivandrum (IN)

(73) Assignee: IBS SOFTWARE FZ-LLC (AE)

( * ) Notice: Subject to any disclaimer, the term of this patent is extended or adjusted under 35 U.S.C. 154(b) by 11 days.

(21) Appl. No.: 16/167,797

(22) Filed: Oct. 23, 2018

(65) Prior Publication Data
US 2020/0125418 A1 Apr. 23, 2020

(51) Int. Cl.
| | | |
|---|---|---|
| G06F 15/16 | (2006.01) |
| G06F 9/50 | (2006.01) |
| H04L 29/06 | (2006.01) |
| H04L 12/24 | (2006.01) |
| H04L 12/851 | (2013.01) |

(52) U.S. Cl.
CPC ........ *G06F 9/5077* (2013.01); *H04L 41/0813* (2013.01); *H04L 47/2483* (2013.01); *H04L 63/0807* (2013.01)

(58) Field of Classification Search
CPC .............. G06F 9/5077; H04L 41/0813; H04L 47/2483; H04L 63/0807

USPC .................. 709/223, 220; 719/320
See application file for complete search history.

(56) References Cited

U.S. PATENT DOCUMENTS

| | | | |
|---|---|---|---|
| 10,044,522 B1* | 8/2018 | Shamis | H04L 41/0816 |
| 2005/0132381 A1* | 6/2005 | Fiammante | G06F 8/24 |
| | | | 719/310 |
| 2010/0114618 A1 | 5/2010 | Wilcock et al. | |
| 2014/0040791 A1 | 2/2014 | Kim et al. | |
| 2015/0370585 A1* | 12/2015 | Dawson | G06F 11/3688 |
| | | | 717/148 |
| 2018/0083967 A1* | 3/2018 | Subramanian | H04L 41/5041 |

* cited by examiner

*Primary Examiner* — David R Lazaro
*Assistant Examiner* — Mariegeorges A Henry
(74) *Attorney, Agent, or Firm* — Dilworth IP, LLC (57) ABSTRACT

A method and a system for facilitating multitenancy of services are described herein. The processor 201 of the system may execute instructions stored in memory 203 for generating, fine grained services, wherein fine-grained services comprise code, content and configurations. The processor 201 may orchestrate, fine-grained services in order to form coarse grained services. The processor 201 may receive a request from a user. The processor 201 may identify, the tenant associated with received request from the plurality of tenants. The processor 201 may load, tenant specific content and configuration. The processor 201 may invoke tenant specific flow. The processor 201 may perform dynamic variation on the current code, content and configurations of fine-grained services and coarse-grained services by injecting tenant specific code, content and\or configuration.

12 Claims, 10 Drawing Sheets

METHOD AND A SYSTEM FOR FACILITATING MULTITENANCY OF SERVICES

CROSS-REFERENCE TO RELATED APPLICATIONS AND PRIORITY

The present application does not claim priority from any other patent application.

TECHNICAL FIELD

The present subject matter described herein, in general, relates to multitenant services. Particularly, the present subject matter provides system and method for facilitating multitenancy of services.

BACKGROUND OF THE INVENTION

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Multi-tenancy is the key common attribute of both public and private clouds. The multitenant application design is created to enable users of multiple tenants to access the same application logic simultaneously. Each tenant has its own view of the application that it uses, administers, and customizes as a dedicated instance of the software while remaining unaware of other tenants that are using the same application. A tenant is any application, either inside or outside the enterprise, that needs its own secure and exclusive virtual computing environment. For multitenant applications, even though the core of the functionality remains the same, there are multiple aspects where variations are required.

Traditionally, variations from the main flow has been accommodated in software programming by one or more combinations. By using Conditional Statement features of a programming language different computations or actions are performed depending on whether a programmer-specified Boolean condition evaluates to true or false. Specifically, Object-oriented programming, or OOP uses the notion of objects, which are entities and a class which is a blueprint of an object. The object will have attributes or data elements and methods which are specialized instruction sets capable of mutating its attributes. Furthermore, objects being the basic units of Object-oriented programming knows how to carry out certain actions and how to interact with other similar objects in the programming paradigms. Cloud Native Architecture speaks about patterns and practices one need to adopt in building software applications for operating efficiently in a public cloud environment. SaaS is a software delivery model where the software is hosted and administered centrally by the SaaS provider and the end user functionality is delivered typically over the network as a remote service. The software is hosted on behalf of one or more customers called tenants and the end users are users accessing services provided by these tenants. The SaaS provider meters and bills the tenants for access to the features of the application on a subscription license model or on a "pay per use" model.

The functional and non-functional requirements wished by the tenants will have commonality and variations. The commonalities can be addressed by having a single runtime instance of the hosted application serving multiple tenants. But this impedes the capability to allow variations as per tenant's choice. But by suitably provisioning Application Architectures, commonality and variations can be equally addressed in the single runtime instance hosting.

For multitenant applications, even though the core of the functionality remains the same, there are multiple aspects where variations are required. There are programming constructs which are of higher order of abstraction which can be leveraged to address our requirement. Aspect Oriented Programming (AOP) is a programming paradigm that aids to add additional behaviour to existing code (an advice) without modifying the code itself, instead separately specifying which code is modified via a "pointcut" specification at various join points. AOP is not defined by the core of any programming language, but there are multiple AOP implementations that includes programming methods and tools that support different programming languages. Hence addressing programming for multi tenancy by leveraging AOP is just one way of using AOP, not a means to address multitenancy by itself. Implementation of multitenancy by programming decreases the maintainability of code as the number of tenant increases.

A workflow consists of a sequence of operations orchestrated so as to execute it repeatable. Workflows often uses Rule Engines where the rules to change the main execution path based on the context can be externalized. Most ways of using Workflows, Orchestrations and/or Rule Engines to addressing programming for multi tenancy is again by using special authoring tools and runtime engines—which are out of the core programming constructs of any particular programming language, but dependent on special purpose tools. Programming style for multi tenancy by leveraging one or all of these tools is just one way of using these tools, not a means to address multitenancy by itself.

Therefore, there is long standing need of system and method for facilitating multitenancy of services.

SUMMARY OF THE INVENTION

This summary is provided to introduce concepts related to system and method for facilitating multitenancy of services and the concepts are further described below in the detailed description. This summary is not intended to identify essential features of the claimed subject matter nor is it intended for use in determining or limiting the scope of the claimed subject matter.

In one embodiment, a system for facilitating multitenancy of services is disclosed. The system comprises a processor and a memory. The processor may be configured to execute instructions stored in the memory. The processor may be configured to execute instructions for generating, fine grained services, wherein fine-grained services comprise code, content and configurations, wherein fine-grained services may be configured to provide same functionality to each tenant of a plurality of tenants, irrespective of an identity of each tenants. The processor may be configured to execute instructions for orchestrating, fine-grained services in order to form coarse grained services, wherein coarse-grained services are configured to provide variations in functionality based on tenant preferences. The processor may be configured to execute instructions for receiving, a request from a user. The processor may be configured to execute instructions for identifying, the tenant associated with received request from the plurality of tenants. The processor may be configured to execute instructions for loading tenant specific content and configuration. The processor may be configured to execute instructions for invoking tenant specific flow, wherein tenant specific flow is executed by orchestrating fine-grained services based on the flow configuration. The processor may be configured to execute instructions for performing, dynamic variation in the code, content and\or configurations of fine-grained services and coarse-grained services by injecting tenant specific code, content and\or configuration.

In one embodiment, a method for facilitating multitenancy of services is disclosed. The method may comprise generating, via a processor, fine grained services, wherein fine-grained services comprise code, content and configurations. Fine-grained services may be configured to provide same functionality to each tenant of a plurality of tenants, irrespective of an identity of each tenants. The method may comprise orchestrating, via the processor, fine-grained services in order to form coarse grained services. Coarse-grained services may be configured to provide variations in functionality based on tenant preferences. The method may comprise receiving, via the processor, a request from a user. The method may comprise identifying, via the processor, the tenant associated with received request from the plurality of tenants. The method may comprise loading, via the processor, tenant specific content and configuration. The method may comprise invoking, via the processor, tenant specific flow, wherein tenant specific flow is executed by orchestrating fine grained services based on the flow configuration. The method may comprise performing, via the processor, dynamic variation in the code, content and\or configurations of fine-grained services and coarse-grained services by injecting tenant specific code, content and\or configuration.

BRIEF DESCRIPTION OF DRAWINGS

The detailed description is described with reference to the accompanying Figures. In the Figures, the left-most digit(s) of a reference number identifies the Figure in which the reference number first appears. The same numbers are used throughout the drawings to refer like features and components.

DETAILED DESCRIPTION OF THE INVENTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
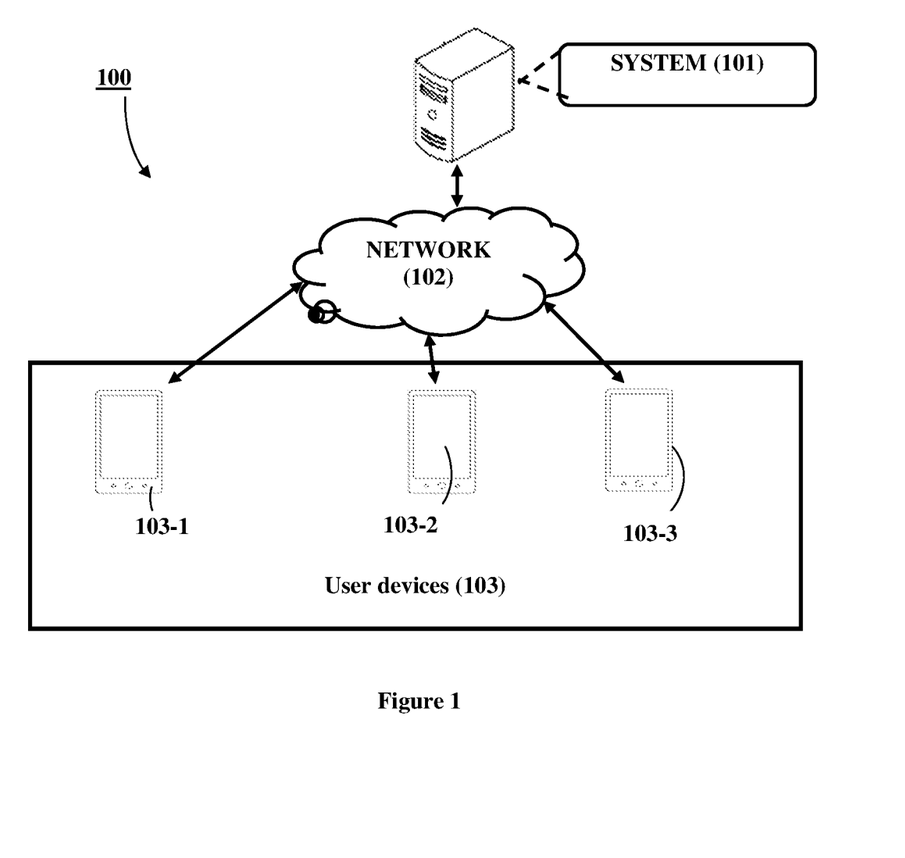
FIG. 1 illustrates an implementation 100 of a system 101 for facilitating multitenancy of services, in accordance with an embodiment of the present subject matter.

Referring to FIG. 1, an implementation 100 of a system 101 for facilitating multitenancy of services, is illustrated in accordance with an embodiment of the present subject matter. In one implementation, the system 101 may be connected to a user device 103 through a network 102. It will be understood that the system 101 may be accessed by multiple users through one or more user devices 103-1, 103-2, 103-3, collectively referred as user device 103 hereinafter, or user 103, or applications residing on the user device 103.

In an embodiment, as illustrated in FIG. 1, the system 101 may accept information provided by multiple users 103-1, 103-2, 103-3 using the user device 103, to register the respective user with the system 101.

In an embodiment, though the present subject matter is explained considering that the system 101 is implemented as a cloud server, it may be understood that the system 101 may also be implemented in a variety of user devices, such as but are not limited to, a portable computer, a personal digital assistant, a handheld device, a mobile, a laptop computer, a desktop computer, a notebook, a workstation, a mainframe computer, and the like.

In one embodiment, the system 101 may also referred as "Object Style Adaptive Programming" (OSAP) Framework. In one embodiment, "Object Style Adaptive Programming" (OSAP) Framework may be a computer programming layer for programming for multi tenancy by leveraging the core programming constructs of a programming language alone. The concept of "Object Style Adaptive Programming" (OSAP) framework is different from Object Oriented Programming (OOP). OOP defines class containing attributes, methods and instances of these classes as the building block, whereas OSAP defines Services built using Code, Content and Configurations as the building blocks. Therefore, the concept of reusability (i.e. polymorphism) and overriding at a level of objects and classes in OOPs is extended to higher level constructs including code, content and configuration in the OSAP framework proposed in accordance with various embodiments of the present disclosure.

In one implementation, the network 102 may be a wireless network, a wired network or a combination thereof. The network 102 can be accessed by the device using wired or wireless network connectivity means including updated communications technology.

In one implementation, the network 102 may be a wireless network, a wired network or a combination thereof. The network 102 can be implemented as one of the different types of networks, cellular communication network, local area network (LAN), wide area network (WAN), the internet, and the like. The network 102 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 102 may include a variety of network devices, including routers, bridges, servers, computing devices, storage devices, and the like.

Figure 2:
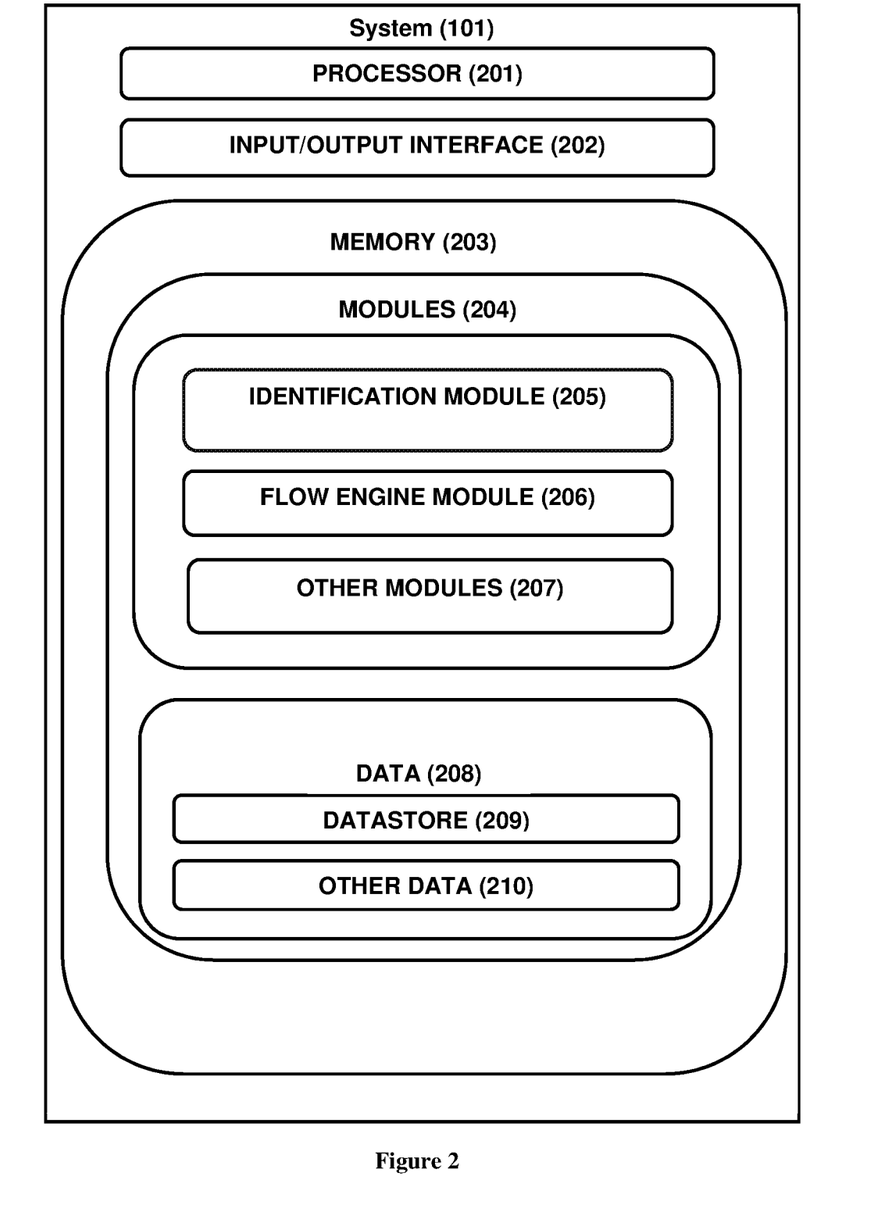
FIG. 2 illustrates components of the system 101, in accordance with an embodiment of a present subject matter.

Referring to FIG. 2, components of the system 101, comprises at least one processor 201, an input/output (I/O) interface 202, a memory 203, modules 204 and data 210. In one embodiment, at least one processor 201 is configured to fetch and execute computer-readable instructions stored in the memory 203.

In one embodiment, the I/O interface 202 implemented as a mobile application or a web-based application may include a variety of software and hardware interfaces, for example, a web interface, a graphical user interface, and the like. The I/O interface 202 may allow the system 101 to interact with the user devices 103. Further, the I/O interface 202 may enable the user device 103 to communicate with other computing devices, such as web servers and external data servers (not shown). The I/O interface 202 can facilitate multiple communications within a wide variety of networks and protocol types, including wired networks, for example, LAN, cable, etc., and wireless networks, such as WLAN, cellular, or satellite. The I/O interface 202 may include one or more ports for connecting to another server.

In an exemplary embodiment, the I/O interface 202 is an interaction platform which may provide a connection between users and system 101.

In an implementation, the memory 203 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and memory cards. The memory 203 may include modules 204 and data 207.

In one embodiment, the modules 204 include routines, programs, objects, components, data structures, etc., which perform particular tasks, functions or implement particular abstract data types. In one implementation, the modules 204 may include an identification module 205, a flow engine module 206 and other modules 207.

In one embodiment, the flow engine module 206, may be configured to generate fine grained services.

In one embodiment, fine grained services may comprise code, content, and configuration. In one embodiment, the system 101 may provide business services. In one embodiment, at fine grain level, the system 101 may provide same functionality to each tenant of a plurality of tenants, irrespective of the tenant's identity. In one embodiment, fine grained service is the basic elementary construct. The system 101 may support inclusion of one or more variability pre and post each of fine grained service. In one embodiment, variabilities may be of different types including but not limited to rules, validations, extra programming constructs \extra fine-grained services, data transformations, protocol conversions, all typical architectural non-functional requirements like audit, log, etc. Similarly, since each fine grained business service is the basic elementary construct, therefore, system 101 may support inclusion or exclusion of one or more of previously stated constructs of variation for a particular tenant.

In one embodiment, the flow engine module 206, may be configured to orchestrate fine-grained services in order to form coarse grained services. In one embodiment, the coarse-grained services may be composed for each tenant, by orchestrating or aggregating fine grained services. In one exemplary embodiment, when the processor 201 may execute coarse grained services, then core functionality may remain the same when looked from an overall business domain perspective. But variations may exist to the functionality based on tenant preferences.

In one exemplary embodiment, the seat booking process for two Airlines tenants may be the same, when viewed from an overall business domain perspective, since user reserve a seat in both the cases. In a first case, user may need to provide Personally Identifiable Information (PII) like a user's unique national ID for one Airlines tenant and in a second case, user do not need to provide anything for other Airlines tenant, which are variations within the Booking functionality across these two tenants.

Figure 3:
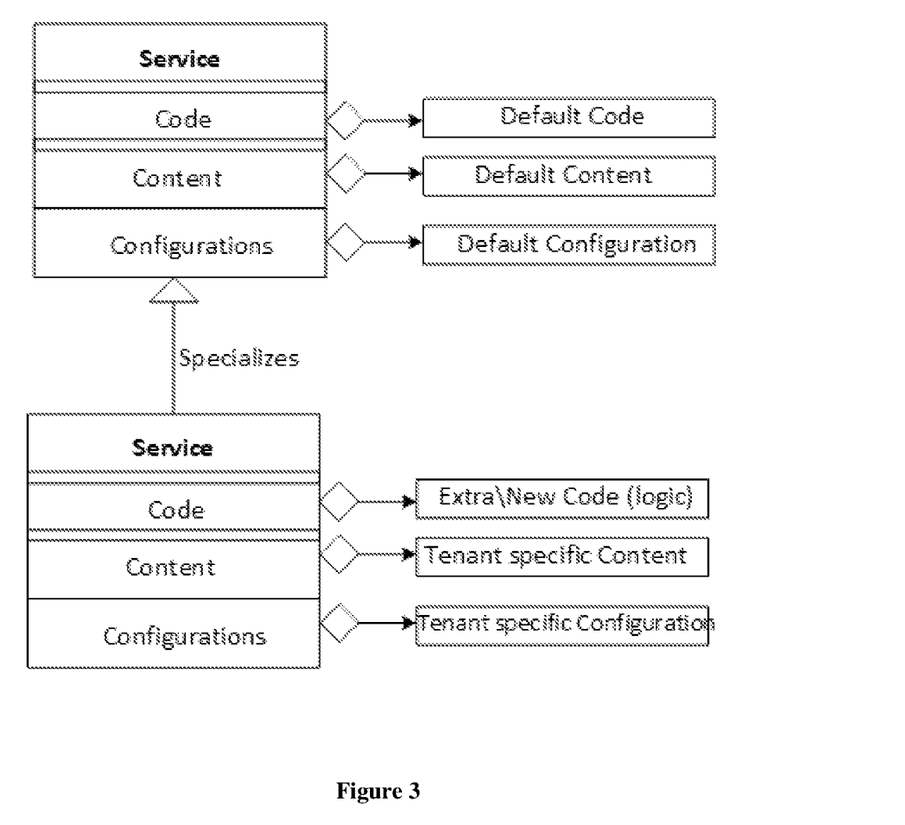
FIG. 3 illustrates a service specialization in the Object Style Adaptive Programming (OSAP) framework, in accordance with the present subject matter.

Now referring to FIG. 3, a service specialization in the OSAP framework is disclosed in accordance with the present subject matter. In one embodiment, the fine-grained service of OSAP framework may comprise code, content and configuration. In one embodiment, code may be built using OOP classes. In one embodiment, content may be static HTML files, Image files, Icons, etc. In one embodiment, configurations may be in XML, CSV files, Text files, YAML files, etc. In one embodiment, a fine-grained service may be aggregated to form a higher order fine grained service. Such fine-grained services may be again aggregated to form a coarse-grained service. In one exemplary embodiment, OSAP Framework borrowed the concept of "Fine Grained Services" and "Coarse Grained Services" from SOA (Service Oriented Architecture). The OSAP Framework extends the notion of "Services" in SOA to software tiers, software layers and software components which is different from core definition of services in SOA. In one embodiment, the OSAP includes Presentation Components, Presentation Widgets, Presentation Wizards, etc. In one embodiment, OSAP Framework may be configured to design all components at a granularity as low as possible. In one embodiment, the OSAP framework may start reuse at low level of granularity. In one embodiment, the OSAP Framework may uses XML based codes to orchestrate fine grained services, as a flow of execution. In one embodiment, the code may support a flow, wherein the flow may be designed as a series of reusable states through which the execution transits. In one embodiment, the transition from one state to the next state in the flow may be affected by the execution of the said fine grained or coarse-grained service. In one embodiment, the flow may accept OOP style objects as input parameters. In another embodiment, the flow may be able to invoke any public service within the run time, similar to a native program call. In another embodiment, the flow may be able to control the flow logic based on the input parameters, return value of a service call or any other data available in the context. In another embodiment, the flow may also return an OOP style object as the final result.

Now again referring to FIG. 2, the system 101 may be configured to receive request from the user.

In one embodiment, the identification module 205 may be configured to identify tenant associated with received request from the plurality of tenants. In one embodiment, the tenant may be identified from a session token, wherein the session token is retrieved from the request. In another embodiment, tenant may be identified either from domain name or URL parameters or authentication information.

In one embodiment, the flow engine module 206, may be configured to load tenant specific content and configuration. In one embodiment, the flow engine module 206 may be configured to load tenant specific content and configuration inherited from those of the parent tenant of a multi-level inheritance hierarchy of the tenant. In one embodiment, the content and configuration of the tenant may be superimposed on top of content and configuration of a previously defined parent tenant and so on in the multi-level inheritance hierarchy of the tenant, in order to obtain fully inherited and overridden behaviour of tenant.

In one embodiment, the flow engine module 206, may be configured to invoke, tenant specific flow, wherein tenant specific flow is executed by orchestrating fine-grained services based on the flow configuration. In one exemplary embodiment, tenant specific flow may be executed as defined in the flow descriptor file name In one embodiment, the flow descriptor file name may be configured for each method in service interface. In one embodiment, the flow engine module 206 may map the input data in the method of the service interface to inputs configured for the tenant specific flow. In one exemplary embodiment, each method in the service interface may correspond to each functionality in the product. In one embodiment, the input data and output data may also correspond to the business functionality. In exemplary embodiment "flight Search" may be a service method for performing the flight search in a booking system. In one embodiment, 'search parameters' may be the input data and 'flight list' associated with search parameters may be the output data.

In one embodiment, the flow engine module 206 may be configured to perform, dynamic variation in the code, content and\or configurations of fine-grained services and coarse-grained services by injecting tenant specific code, content and\or configuration.

Figure 4:
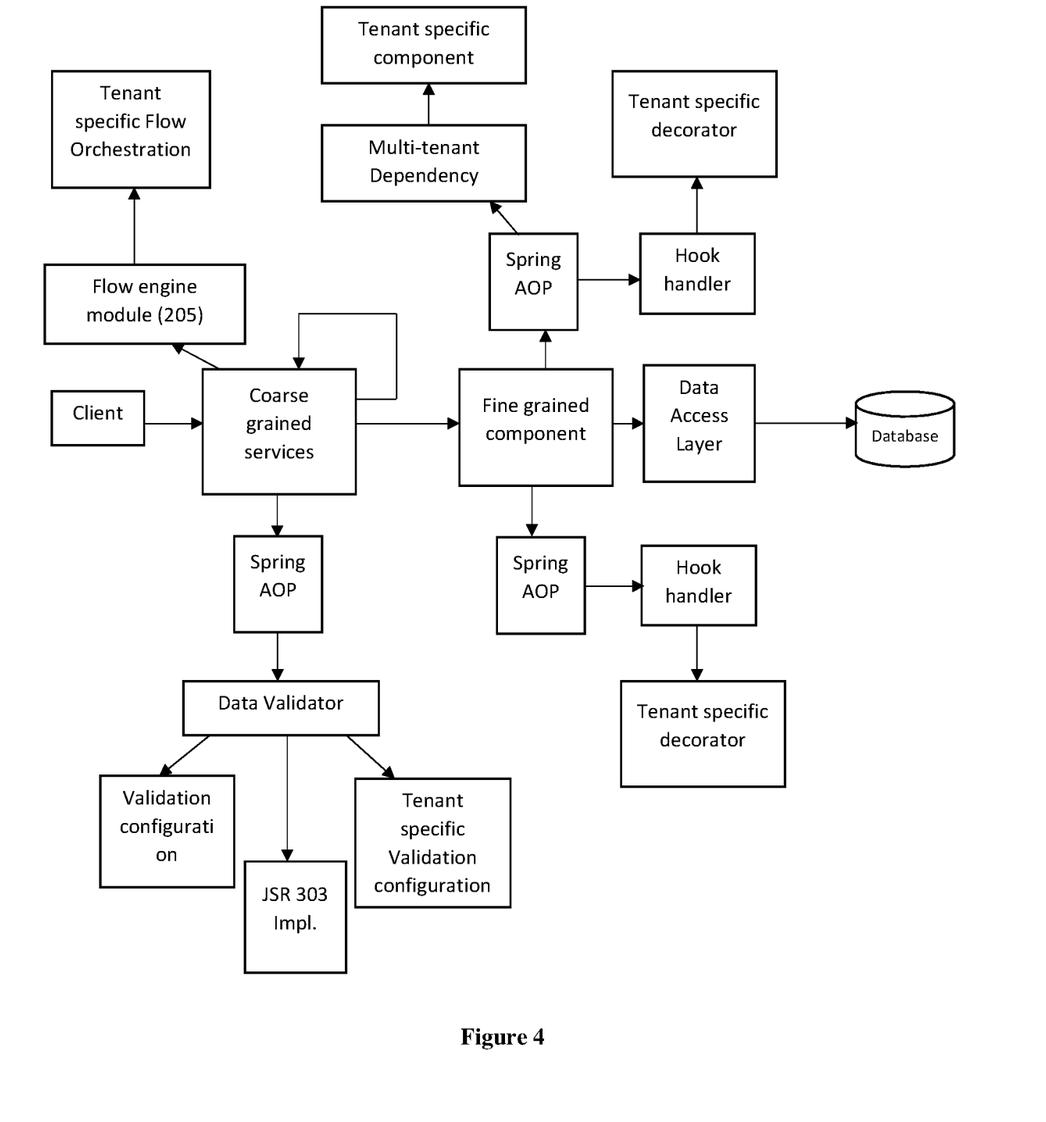
FIG. 4 illustrates a meta model for the system 101, in accordance with an embodiment of the present subject matter.

Now referring to FIG. 4, a meta model for the OSAP framework is disclosed in accordance with an embodiment of the present subject matter. The meta model for the OSAP framework, comprises a service layer, a service component and a Data Access Layer. In one embodiment, the OSAP framework may comprise extension points and injection points, wherein the tenant specific code, content and/or configuration may be ingested. In one embodiment, ingested tenant specific code, content and/or configuration may provide adaptive behaviour for the software execution.

In one embodiment, the flow engine module 205 may be configured to implement the coarse-grained service of the service layer as a flow orchestration. In one embodiment, the flow may comprise of different states which invokes fine grained components or other coarse-grained services. In one embodiment, states may be overridden selectively using tenant specific flow orchestration, wherein states may be added or removed. In one embodiment, the flow engine module 205 may follow object style principles. In one embodiment, the states which are not overridden, may be inherited from the flow definition of its parent tenant or base tenant. In one embodiment, the flow engine module 205, may be capable of merging the flow definitions of the specific tenant and the parent tenant. If a flow definition is not present for the specific tenant, the parent flow definition itself may be inherited.

In one embodiment, the service component comprises a fine-grained component. In one embodiment, the fine-grained components may implement core business functionality of the product. In one embodiment, the system 101 may put Spring Framework's AOP interceptors in order to add capabilities like Multi-Tenant Dependency Injection (MTDI) and Tenant Specific Decorators (Hooks). In one embodiment, an implementation of a service component may be replaced with a tenant specific implementation by using MTDI. Further, MTDI may be useful for a business logic being implemented completely different for a particular tenant. In one embodiment, a business functionality may be implemented by the service component using Tenant Specific Decorators. In one embodiment, the business functionality may be enriched for the tenant by adding input pre-processors, output post-processors and exception handlers. The Tenant Specific Decorators may be used to perform slight variations in business process for a particular tenant.

In one embodiment, the data access layer may use MTDI or hooks based on the tenant specific data persistence requirements.

Figure 5:
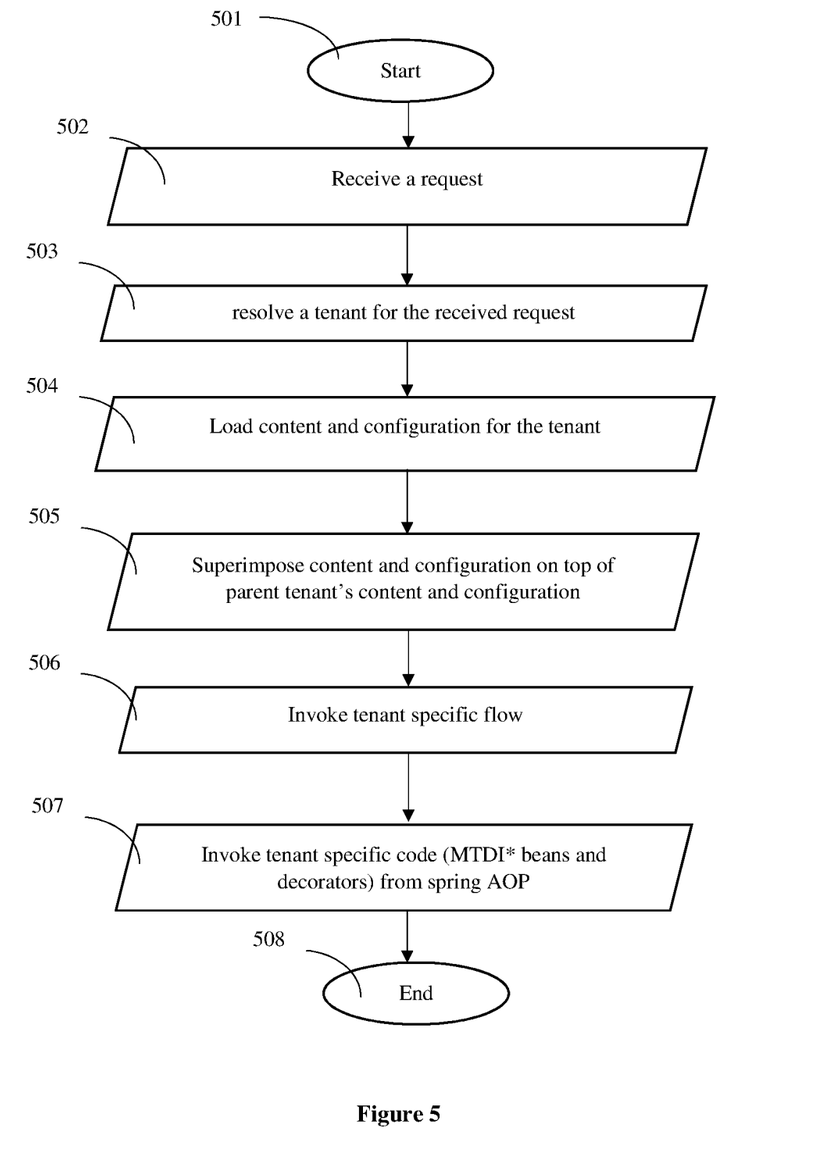
FIG. 5 illustrates a stepwise process of tenant overriding, in accordance with an embodiment of the present subject matter.
Figure 6:
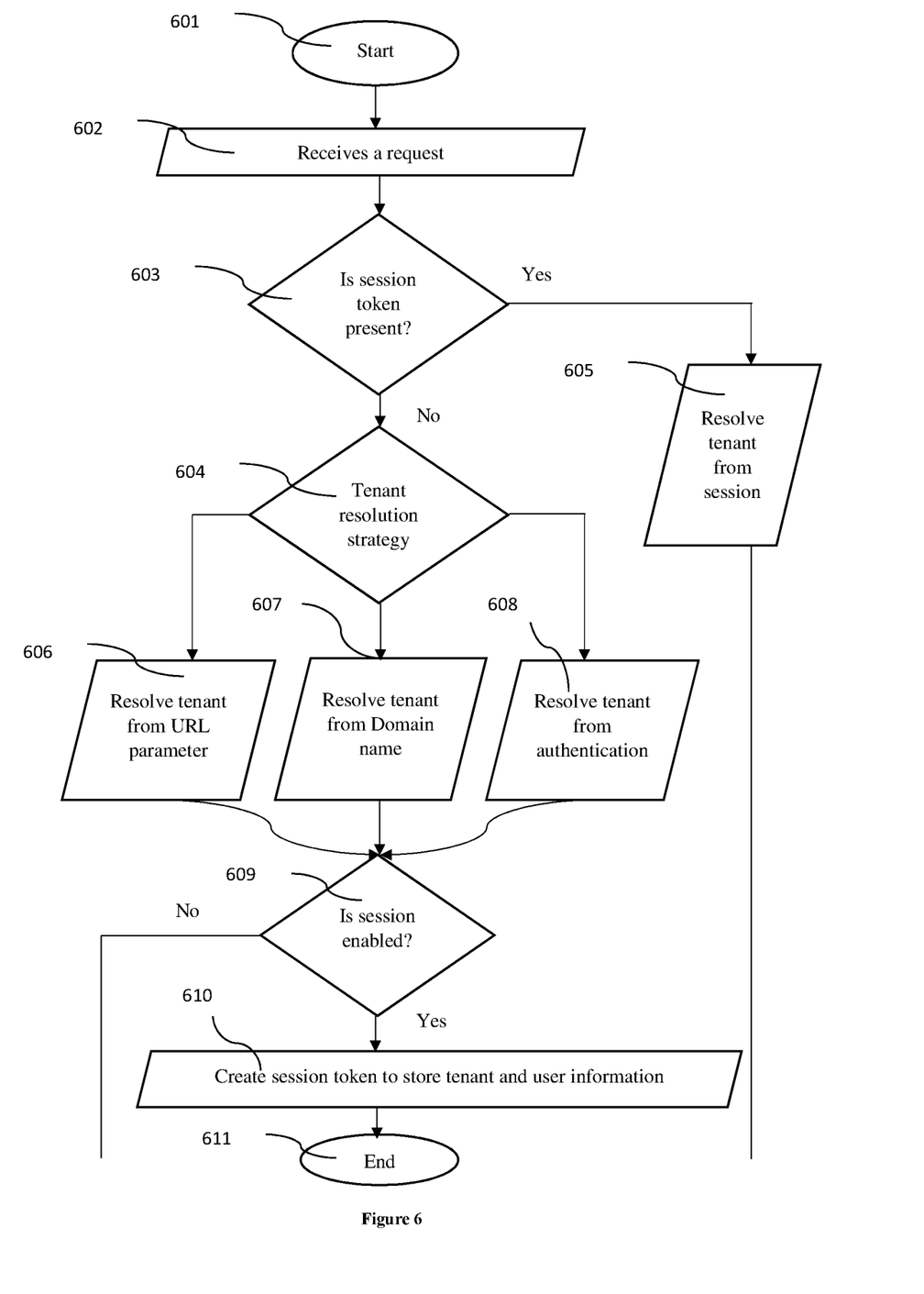
FIG. 6 illustrates a stepwise process of resolving the tenant for the received request, in accordance with the embodiment of the present subject matter.

Now referring to FIG. 5, a stepwise process of tenant overriding is disclosed, in accordance with the embodiment of the present subject matter. At step 501, the system 101 may start the execution of instructions stored in memory. At step 502, the system 101 may be configured to receive the request. In one embodiment, the request may be configured to trigger the process of tenant overriding. In one exemplary embodiment, the request may be an internal request such as a scheduled job. In another exemplary embodiment, the request may be an external request. In case of the external request, at step 503, the system 101 may be configured to resolve the tenant for the received request. Now referring to FIG. 6, a stepwise process of resolving the tenant for the received request is disclosed, in accordance with the embodiment of the present subject matter. At step 601, the system 101 may be configured to start the execution of the instructions stored in the memory. At step 602, the system 101 may be configured to receive the request. In one exemplary embodiment, the request may be received via a web (HTTP) session enabled application. In one embodiment, any request after the first request may have a session token. At step 603, the system 101 may check whether the session token is present or not. If the session is present, then at step 605, the system 101 may resolve tenant from the session and further end the process. If the session token is not present, then at step 604, the system 101 may invoke the product defined tenant resolution strategy in order to resolve the tenant. If tenant have different domain name (DNS, refers to Domain Name Service), then at step 607, the system 101 may resolve the tenant from the domain name. At step 606, the system 101 may resolve the tenant from URL parameter. At step 608, the system 101 may resolve the tenant from an authentication. In one embodiment, the authentication may be a channel authentication in case of Business to Business (B2B) client. In one embodiment, the authentication may be a user authentication in case of Business to Consumer (B2C) client. At step 609, the system 101 may check whether the session is enabled. If the session is enabled, then at step 610, the system 101 may create session token to store tenant and user information. At step 611, the system 101 may end the process. If session is not enabled, the system 101 may end the process.

Figure 7:
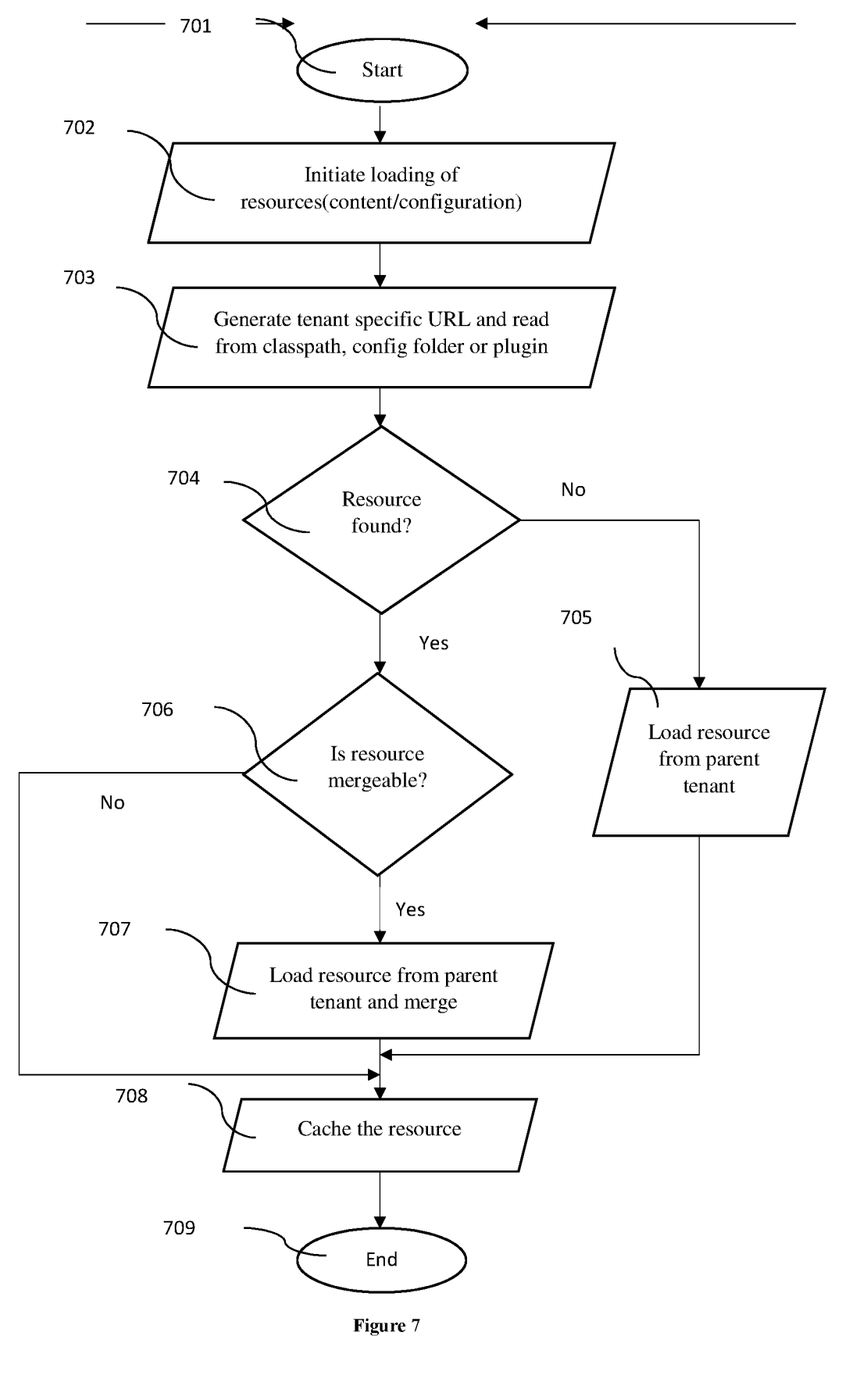
FIG. 7 illustrates a stepwise process of loading of tenant specific content/configuration, in accordance with the embodiment of the present subject matter.

Now again referring to FIG. 5, after resolving the tenant, the system 101 may load content and configuration of the tenant at step 504. In one embodiment, once the tenant is identified, content and configuration for the tenant is fetched based on conventions. In one exemplary embodiment, content for the tenant may be in a folder named with tenant id. In one embodiment, the tenant may have multi-level inheritance hierarchy similar to concept of OOP. The tenant may be inherited from a parent tenant, wherein the parent tenant may be inherited from its parent tenant and so on. In one embodiment, root of the multi-level inheritance hierarchy may be base or core product. Now referring to FIG. 7, a stepwise process of loading of tenant specific content/configuration is disclosed, in accordance with the embodiment of the present subject matter. At step 701, the system 101 may start the execution of the instructions stored in the memory. At step 702, the system 101 may initiate loading of resources. In one exemplary embodiment, resource may be content or configuration. At step 703, the system 101 may generate tenant specific URL based on the convention and attempt to read resources from class path, config folder and tenant specific plugins. At step 704, the system 101 may check whether the tenant specific resource is found or not. If tenant specific resource is not found, then at step 705, the system 101 may load resource inherited from parent tenant. If the tenant specific resource is found, then at step 706, the system 101 may check whether resource is mergeable or not. If the resource is mergeable, then at step 707, the system 101 may load resource from parent tenant and merge. If the resource is not mergeable, then at step 708, the system 101 may perform caching of resources of the tenant for the future use. In one exemplary embodiment, Internationalisation Bundle, validation configuration, Business configuration, flow configuration and integration configuration are mergeable resources. In another exemplary embodiment, HTML content and Images are Non-mergeable resources. At step 709, the step 101 may end the process.

Now again referring to FIG. 5, at step 505, after loading the content and configuration for the tenant the system 101, may superimpose content and configuration of the tenant on the top of the content and configuration of the parent tenant. In one embodiment, the system 101, may superimpose content and configuration of the parent tenant on the top of the content and configuration of its parent tenant and so on in order to obtain fully inherited and overridden behaviour. At step 506, the system 101 may execute instructions to invoke tenant specific flow.

Figure 8:
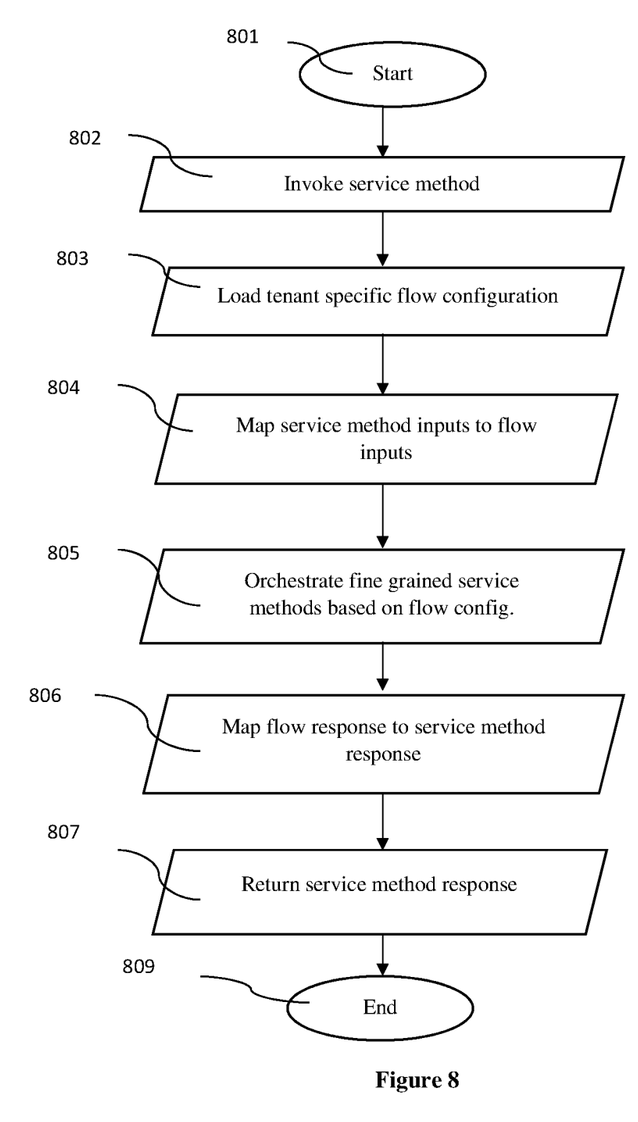
FIG. 8 illustrates a stepwise process of invoking tenant specific flow as an implementation of coarse grained service functionality, in accordance with an embodiment of the present subject matter.

Now referring to FIG. 8, a stepwise process of invoking tenant specific flow as an implementation of coarse-grained service functionality, is disclosed in accordance with an embodiment of the present subject matter. At step 801, the system 101 may start execution of the instructions stored in the memory. At step 802, the system 101 may invoke the service method. In one exemplary embodiment, the system 101 may configure a flow descriptor file name for each method in service interface. At step 803, the system 803 may load the tenant specific flow configuration, using multi-tenant resource loading capability. At step 804, the system 101 may be configured to map the input data of the service interface to inputs configured for the flow inputs. At step 805, the system 101 may be configured to orchestrate fine-grained services, based on the flow configuration. At step 806, the system 101, may map flow response to service method response. At step 807, the system 101 may return service method response. At step 808, the system 101 may end the process.

In one embodiment, the coarse-grained services may be defined as a sequence of fine-grained services while building multi-tenant applications using OSAP framework. In one embodiment, the fine-grained services are declaratively defined in flow descriptor file, and this gives flexibility to override a part of the flow for a tenant.

Figure 10:
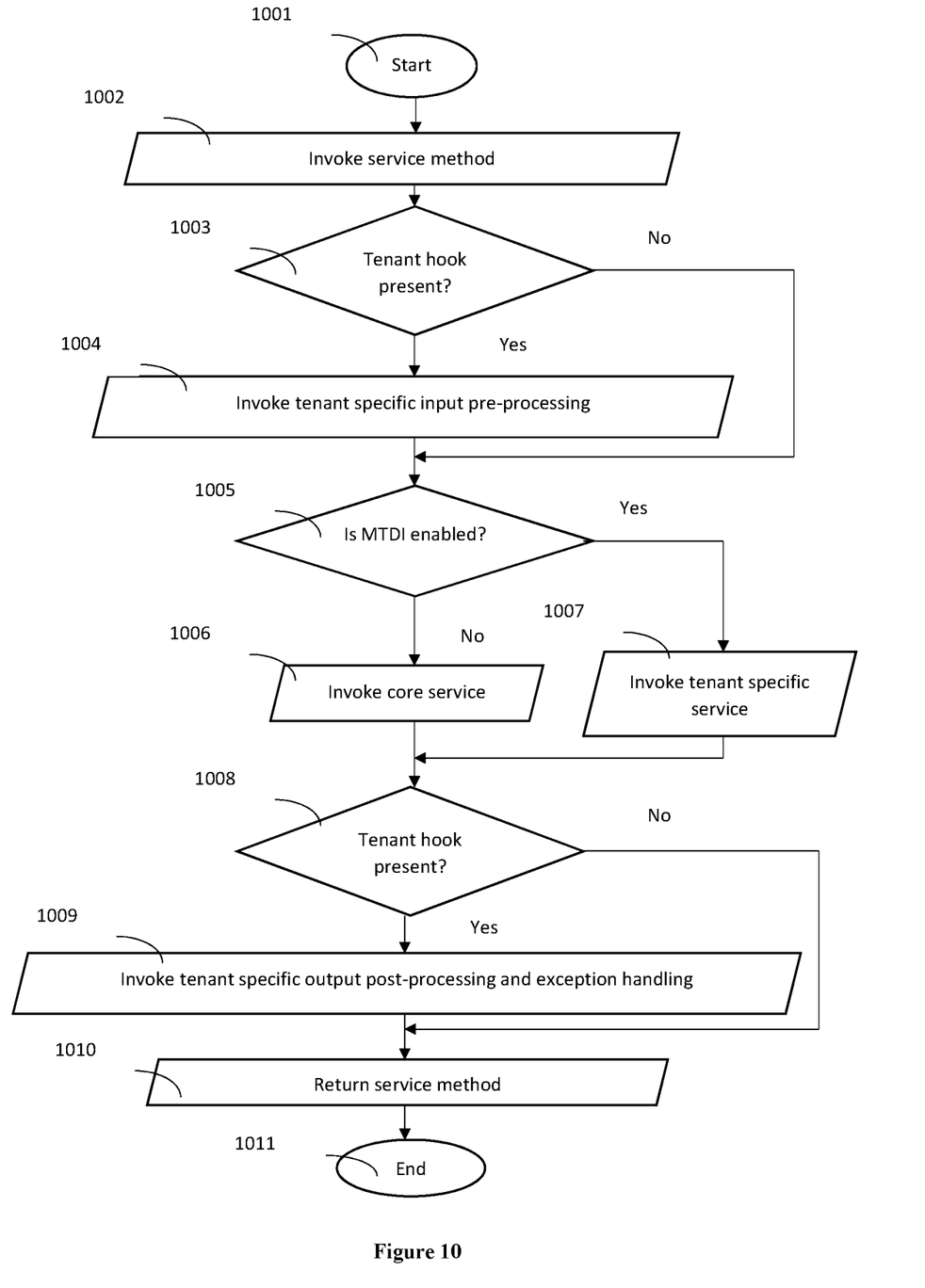
FIG. 10 illustrates a stepwise process of invoking tenant specific code, in accordance with an embodiment of the present subject matter.

Now again referring to FIG. 5, after invoking tenant specific flow, at step 507, the system 101 may invoke Tenant specific code in the form of MTDI (Multi-Tenant Dependency Injection and Tenant Specific Decorators (Hooks). In one embodiment, Multi-tenant dependency Injection (MTDI) may be used for major tenant variations. In one embodiment, tenant specific decorators (hooks) may be used for minor tenant variations. Now referring to FIG. 10, a stepwise process of invoking tenant specific code is disclosed, in accordance with the present subject matter. At step 1001, the system 101 may start the execution of the instructions stored in the memory. At step 1002, the system 101 may invoke service method. At step 1003, the system 101 may check whether a tenant hook is present or not. If the tenant hook is present, then at step 1004, the system 101 may invoke tenant specific input pre-processing. If the tenant hook is not present, then the system 101 may execute step 1005. At step 1005, the system 101 may check whether MTDI is enabled or not. If MTDI is enabled, then at step 1007, the system 101 may invoke tenant specific service. If MTDI is not enabled, then at step 1006 may invoke core service. At step 1008, the system 101 may check whether tenant hook is present or not. If tenant hook is present then at step 1009, the system 101 may invoke tenant specific output post-processing and tenant specific exception handling. If tenant hook is not present then at step 1010, the system 101 may return service method. At step 1011, the system 101 may end the process.

Now again referring to FIG. 5, at step 508, the system 101 may end the process after invoking Tenant specific code in the form of MTDI (Multi-Tenant Dependency Injection and Tenant Specific Decorators (Hooks).

Figure 9:
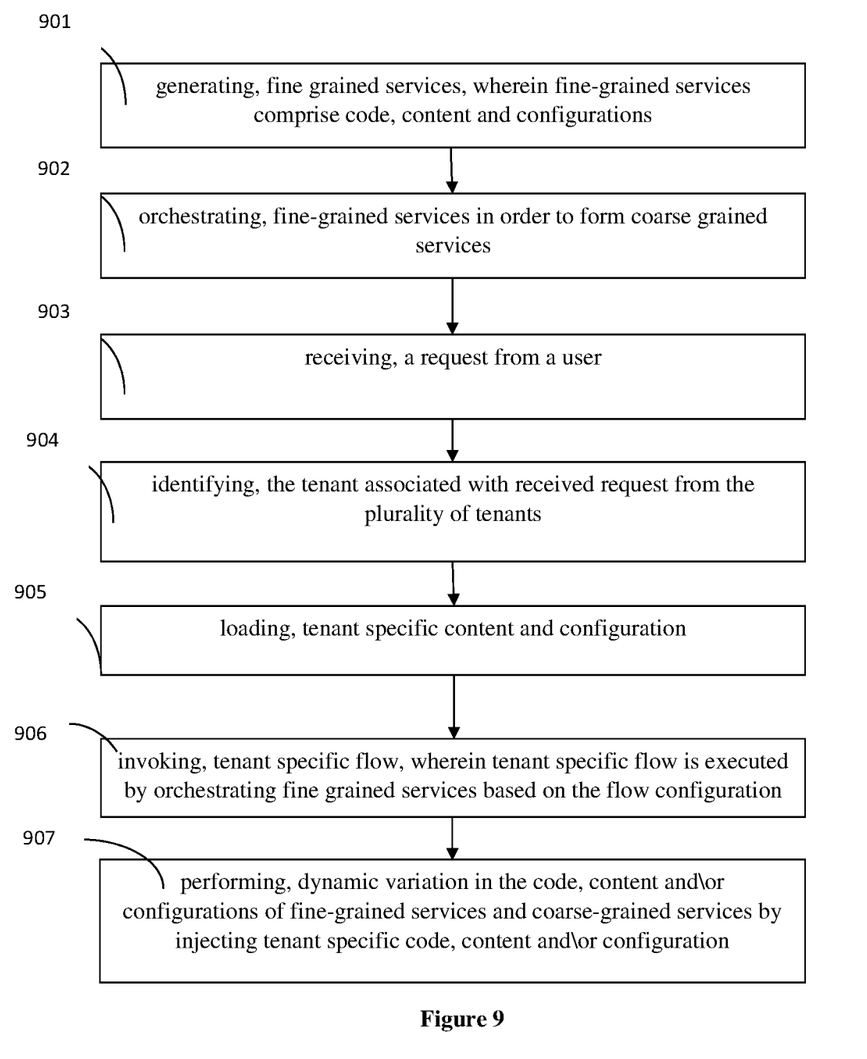
FIG. 9 illustrates a method for facilitating multitenancy of services, in accordance with an embodiment of the present subject matter.

Now referring to FIG. 9, a method for facilitating multi-tenancy of services is disclosed, in accordance with an embodiment of the present subject matter.

At step 901, the processor 201 may be configured to execute instructions for generating, fine grained services, wherein fine-grained services comprise code, content and configurations, wherein fine-grained services are configured to provide same functionality to each tenant of a plurality of tenants, irrespective of an identity of each tenants.

At step 902, the processor 201 may be configured to execute instructions for fine-grained services in order to form coarse grained services, wherein coarse-grained services are configured to provide variations in functionality based on tenant preferences.

At step 903, the processor 201 may be configured to execute instructions for receiving, a request from a user.

At step 904, the processor 201 may be configured to execute instructions for identifying, the tenant associated with received request from the plurality of tenants.

At step 905, the processor 201 may be configured to execute instructions for loading, tenant specific content and configuration.

At step 906, the processor 201 may be configured to execute instructions for invoking, tenant specific flow, wherein tenant specific flow is executed by orchestrating fine grained services based on the flow configuration.

At step 907, the processor 201 may be configured to execute instructions for performing, dynamic variation in the code, content and\or configurations of fine-grained services and coarse-grained services by injecting tenant specific code, content and\or configuration.

What is claimed is:

1. A system for facilitating multitenancy of services, wherein the system comprises:
    a processor; and
    a memory, wherein the processor is configured to execute instructions stored in the memory for
    generating, fine grained services, wherein the fine-grained services comprise code, content and configurations, wherein the fine-grained services are configured to provide the same functionality to each tenant of a plurality of tenants, irrespective of an identity of each tenant;
    orchestrating, the fine-grained services in order to form coarse grained services, wherein the coarse-grained services are configured to provide variations in functionality based on tenant preferences;
    receiving, a request from a user;
    identifying, the tenant associated with the received request from the plurality of tenants;
    loading, tenant specific content and configuration, wherein the tenant specific content and configuration, being loaded, is inherited from parent tenant of a multi-level inheritance hierarchy of the tenant, wherein the content and configuration of the tenant is superimposed on top of content and configuration of a previous parent tenant in the multi-level inheritance hierarchy of the tenant, in order to obtain fully inherited and overridden behavior of tenant;
    invoking, tenant specific flow, wherein the tenant specific flow is executed by orchestrating the fine-grained services based on the flow configuration; and
    performing, dynamic variation in the code, content and\or configurations of the fine-grained services and the coarse-grained services by injecting the tenant specific code, content and\or configuration.

2. The system of claim 1, wherein the tenant is identified from a session token, wherein the session token is retrieved from the request.

3. The system of claim 1, wherein the tenant is identified either from domain name or URL parameters or authentication information.

4. The system of claim 1, configured to map an input data of a service interface to inputs configured for the tenant specific flow.

5. The system of claim 1, configured to execute instructions for reusing the fine grained and the coarse-grained services.

6. The system of claim 1, comprises extension points and injection points, in order to inject the tenant specific code, content and\or configuration.

7. A method for facilitating multitenancy of services, wherein the method comprises:
    generating, via a processor, fine grained services, wherein the fine-grained services comprise code, content and configurations, wherein the fine-grained services are configured to provide same functionality to each tenant of a plurality of tenants, irrespective of an identity of each tenant;
    orchestrating, via the processor, the fine-grained services in order to form coarse grained services, wherein the coarse-grained services are configured to provide variations in functionality based on tenant preferences;
    receiving, via the processor, a request from a user;
    identifying, via the processor, the tenant associated with received request from the plurality of tenants;
    loading, via the processor, tenant specific content and configuration, wherein the tenant specific content and configuration, being loaded, is inherited from parent tenant of a multi-level inheritance hierarchy of the tenant, wherein the content and configuration of the tenant is superimposed on top of content and configuration of a previous parent tenant in the multi-level inheritance hierarchy of the tenant, in order to obtain fully inherited and overridden behavior of tenant;
    invoking, via the processor, tenant specific flow, wherein the tenant specific flow is executed by orchestrating the fine grained services based on the flow configuration; and
    performing, via the processor, dynamic variation in the code, content and\or configurations of the fine-grained services and the coarse-grained services by injecting the tenant specific code, content and\or configuration.

8. The method of claim 7, wherein the tenant is identified from a session token, wherein the session token is retrieved from the request.

9. The method of claim 7, wherein the tenant is identified either from domain name or URL parameters or authentication information.

10. The method of claim 7, configured to map an input data of a service interface to inputs configured for the tenant specific flow.

11. The method of claim 7, reusing the fine grained and the coarse-grained services.

12. The method of claim 7, wherein the tenant specific code, content and\or configuration, are injected to extension points and injection points.

* * * * *